United States Patent [19]

Gotanda

[11] Patent Number: 4,580,010
[45] Date of Patent: Apr. 1, 1986

[54] BUILDING SURVEILLANCE APPARATUS

[76] Inventor: Motohiro Gotanda, 1802-10, Nakabyo, Abiko-shi, Chiba-ken, Japan

[21] Appl. No.: 642,436

[22] Filed: Aug. 20, 1984

[30] Foreign Application Priority Data

Aug. 25, 1983 [JP] Japan ................................ 58-154072

[51] Int. Cl.[4] .......................................... H04M 11/00
[52] U.S. Cl. ...................................... 179/2 A; 179/5 R
[58] Field of Search ................... 179/2 A, 2 AM, 5 R, 179/5 P

[56] References Cited

U.S. PATENT DOCUMENTS 3,969,584 7/1976 Miller et al. ........................ 179/2 A
4,249,036 2/1981 Kutzki ................................ 179/5 R Primary Examiner—W. J. Brady
Attorney, Agent, or Firm—Stephen F. K. Yee

[57] ABSTRACT

A surveillance apparatus for the detection and prevention of damages due to fires, gas, robbery and other destructive conditions of a building which has a large number of rooms each furnished with a telephone set and a door provided with a lock. The telephone cables extending between respective rooms and a main terminal board of the building are utilized as wires for transmitting detection signals of detectors provided in respective rooms to indicators provided in a central surveillance room during the locking of the door.

7 Claims, 8 Drawing Figures

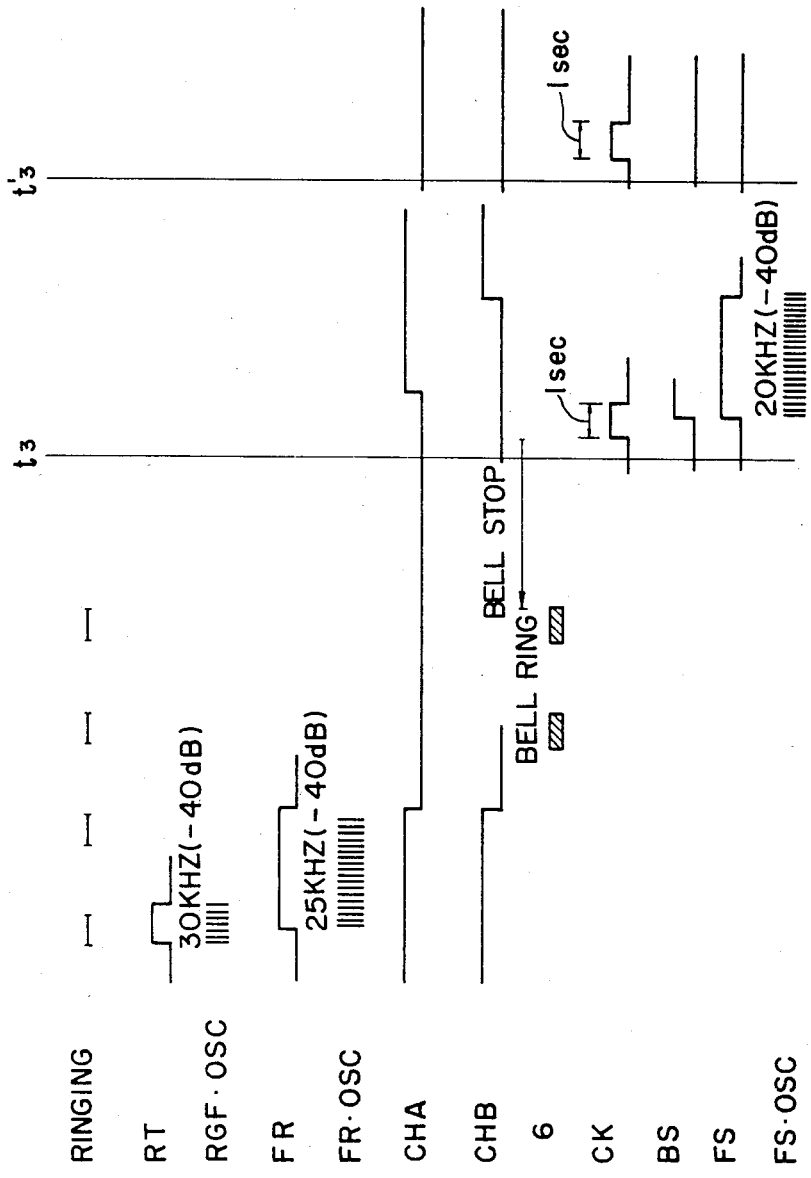

BUILDING SURVEILLANCE APPARATUS

This invention relates to a building surveillance apparatus having detectors provided in various rooms of the building and adapted for generating detection signals upon detecting the occurrence of abnormal conditions in respective rooms, the detection signals being indicated on a central surveillant panel.

Recently, instead of patrols by guardsmen, electronic surveillance has been resorted to more and more in security control of buildings. For example, suitable sensors which are sensitive to smoke, heat, gas, etc., are installed in the respective rooms of a building, and, upon occurrence of an abnormal condition, a relevant sensor or sensors are actuated to produce a signal or signals particular to the respective sensors (e.g., signals of specific voltage levels or frequencies), with the signal or signals transmitted to a central surveillant panel through cable lines which are laid exclusively for this purpose.

In this instance, the provision of cable lines which serve exclusively for the communication between the respective rooms and the central surveillant panel invariably incurs a high installation cost. Moreover, although the installation work is relatively easy in the case of a new building, difficulties are often encountered in postconstruction installation of additional cables. Further, the installation of cables defiles the appearance of the inside of the building.

In accordance with the present invention, there is provided a surveillance apparatus for a building including a plurality of first telephone terminals coupled to a telephone switching unit of a telephone central office, a plurality of rooms each furnished with a door provided with a lock, a second telephone terminal and a telephone set coupled to the second telephone terminal, and cables extending between the first and second telephone terminals, said apparatus comprising:

detecting means provided in each room, adapted to be coupled to the second telephone terminal and capable of generating a detection signal upon detection of an abnormal condition of the room;

switch means adapted for coupling the detection means in each room to the second terminal and operable in relation to the door lock so that the detection means is electrically connected with said second telephone terminal when the door is in a locked state and the detection means is electrically disconnected from said second terminal when the door is in an unlocked state; and indicating means coupled to said cables for indicating the occurrence of the abnormal condition upon receipt of the detection signal transmitted from respective detecting means.

In another aspect, the present invention provides a surveillance apparatus for a building including a plurality of first telephone terminals coupled to a telephone switching unit of a telephone central office, a plurality of rooms each furnished with a door provided with a lock, a second telephone terminal and a telephone set coupled to the second telephone terminal, and cables extending between the first and second telephone terminals, said apparatus comprising a plurality of surveillance units corresponding in number to the number of the rooms, each surveillance unit including:

detecting means provided in each room and capable of generating a detection signal upon detection of an abnormal condition of the room;

first means actuated upon locking of the door for generating a set signal for a first predetermined period of time;

second means actuated upon unlocking of the door for generating a reset signal for a second predetermined period of time;

a first switch coupling said second terminal to either said first means, second means and detecting means or a telephone set such that said second terminal is electrically connected with said first means, second means and detecting means during the locking of the door and during the period from the unlocking of the door till the expiration of said second predetermined period of time;

indicating means adapted for coupling to a contact in said cables and for indicating the occurrence of the abnormal condition upon receipt of the detection signal transmitted from said detecting means;

a second switch adapted for coupling said first terminal to said contact and actuated so that said first terminal is electrically disconnected from said contact;

a third switch adapted for coupling said indicating means to said contact and actuated so that said indicating means is electrically connected with said contact; and control means having said set and reset signals as its input and actuating said second switch upon receipt of said set signal and said third switch after expiration of a third predetermined period of time from the receipt of said set signal, said third predetermined period of time being not shorter than said first predetermined period of time, said control means resetting said third switch upon receipt of said reset signal and resetting said second switch after the expiration of said second period of time upon receipt of said reset signal;

whereby said telephone set and telephone switching unit are disconnected from said cables upon locking of the door and said indicating means and detecting means are connected to said cables after the expiration of said third predetermined period of time from the locking of the door, said indicating means being disconnected from said cables upon unlocking of the door with said telephone set and said telephone switching unit being connected with said cables after expiration of said second predetermined period of time from the unlocking of the door.

In a further aspect of the present invention, there is provided a surveillance apparatus for a building including a plurality of first telephone terminals coupled to a telephone switching unit of a telephone central office, a plurality of rooms each furnished with a door provided with a lock, a second telephone terminal and a telephone set coupled to the second telephone terminal, and cables extending between the first and second telephone terminals, said apparatus comprising a plurality of surveillance units corresponding in number to the number of the rooms, each surveillance unit including:

detecting means provided in each room and capable of generating a detection signal upon detection of an abnormal condition of the room;

first means actuated upon locking of the door or upon receipt of a bell stop signal for generating a set signal for a first predetermined period of time;

second means actuated upon unlocking of the door or upon receipt of a ringing signal for generating a reset signal for a third or fifth predetermined period of time;

first switch coupling said second terminal to either said first means, second means and detecting means or a telephone set;

indicating means adapted for coupling to a contact in said cables and for indicating the occurrence of the abnormal condition upon receipt of the detection signal transmitted from said detecting means;

ringing-detection means for detecting ringing;

a second switch adapted for coupling said first terminal to said contact or said ringing-detection means and actuated so that said first terminal is electrically disconnected from said contact but is connected to said ringing-detection means;

a third switch adapted for coupling said indicating means to said contact and actuated so that said indicating means is electrically connected with said contact; and a first control means having said set and reset signals as its input and actuating said second switch upon receipt of said set signal and actuating said third switch after expiration of a second predetermined period of time from the receipt of said set signal, said second predetermined period of time being not shorter than said first predetermined period of time, said first control means resetting said third switch upon receipt of said reset signal and resetting said second switch after the expiration of a fourth period of time, which is not shorter than said third predetermined period of time, upon receipt of said reset signal;

a third means coupled to said ringing-detection means for generating said ringing signal for a seventh predetermined period of time, said ringing signal being fed to said contact;

a fourth means operable during the locking of the door and generating a ringing-stop signal for a sixth period of time when the ringing is stopped;

a second control means for actuating said first switch so that said second telephone terminal is electrically connected with said telephone set during the period from the expiration of said third period of time after the unlocking of the door till the locking of the door and the period from the expiration of said fifth period of time after the receipt of said ringing signal till the receipt of a bell-stop signal; and a discriminator operable when said ringing-stop signal is generated for discriminating whether the stop of the ringing is caused by the disconnection by the caller or by answering the call, said discriminator generating said bell-stop signal when the stop of the ringing is discriminated as resulting from the disconnection by the caller;

whereby said telephone set and telephone switching unit are disconnected from said cables upon locking of the door and said indicating means and detecting means are connected to said cables after the expiration of said third predetermined period of time from the locking of the door, said indicating means being disconnected from said cables upon unlocking of the door, with said telephone set and said telephone switching unit being connected with said cables after expiration of said second predetermined period of time from the unlocking of the door, the telephone set during the locking of the door being capable of being coupled to said telephone switching unit upon receipt of a call.

The preferred embodiments of builing surveillance apparatus in accordance with the present invention will now be described with reference to the accompanying drawings, in which FIG. 1 is a circuit diagram of one embodiment of a building surveillance apparatus according to the present invention;

Figure 6A:
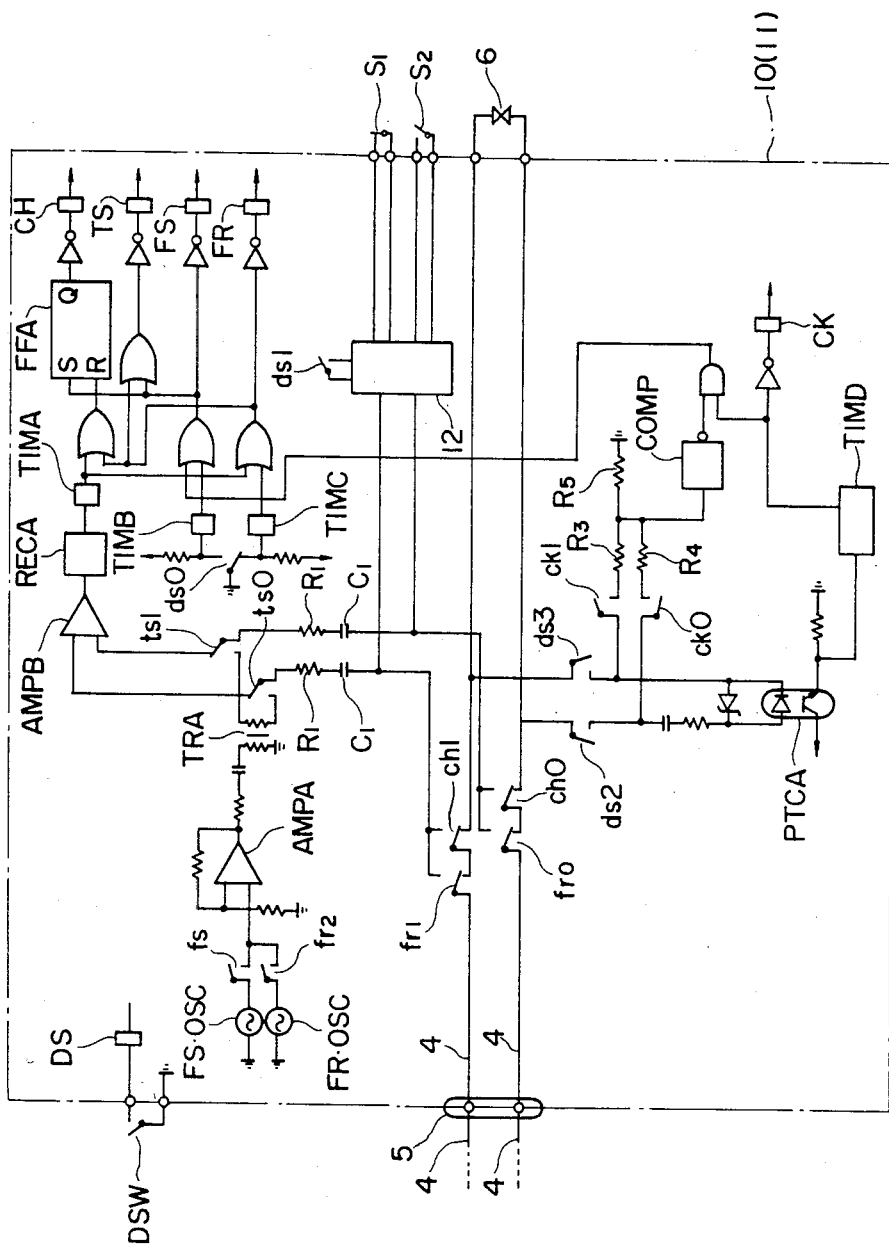
Figure 6B:
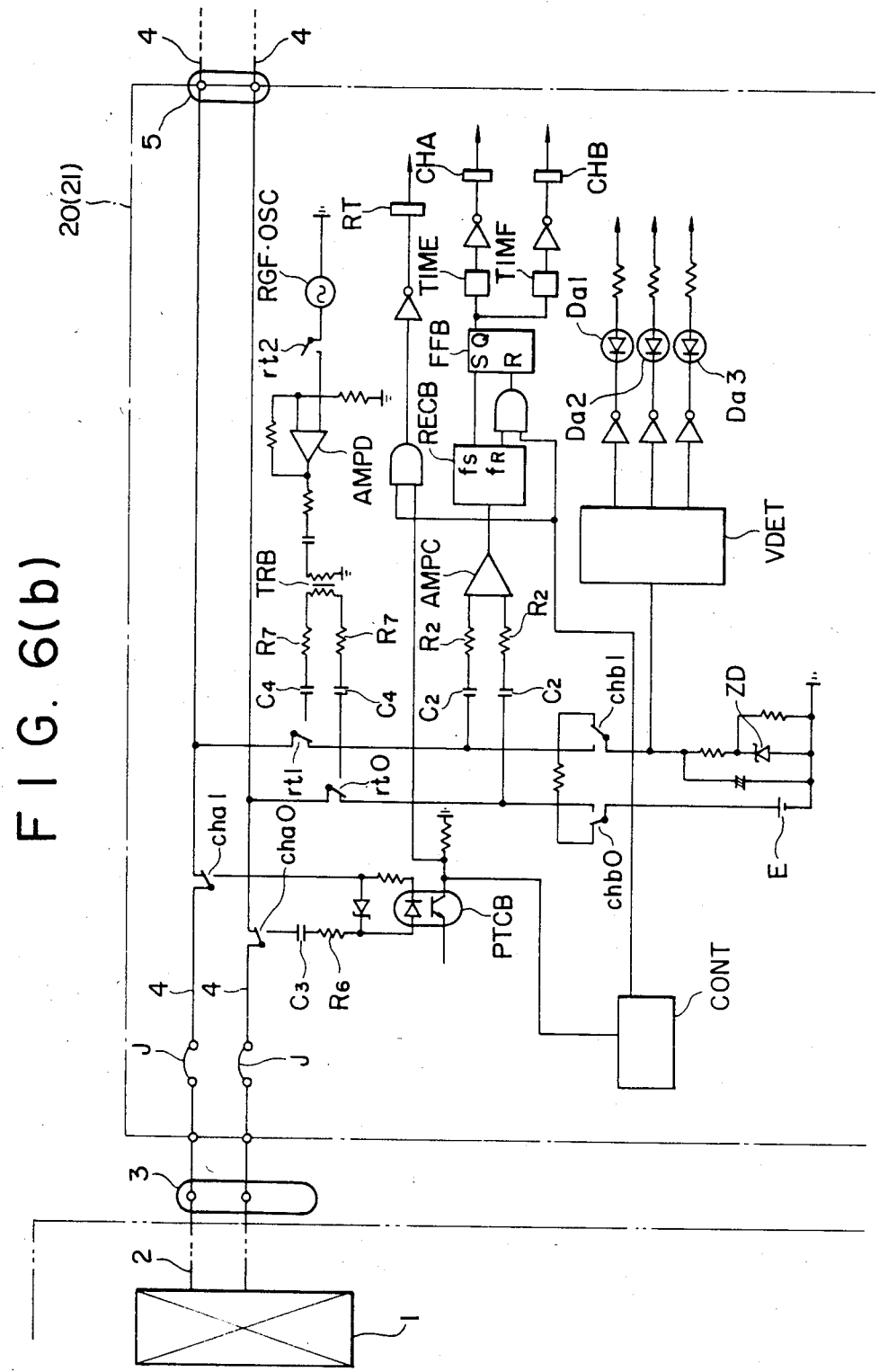

FIGS. 6(a) and 6(b) are partial circuit diagrams of a further embodiment of the present invention; and FIG. 7 is a timing chart showing the operation of the apparatus of FIGS. 6(a) and 6(b).

Figure 1:
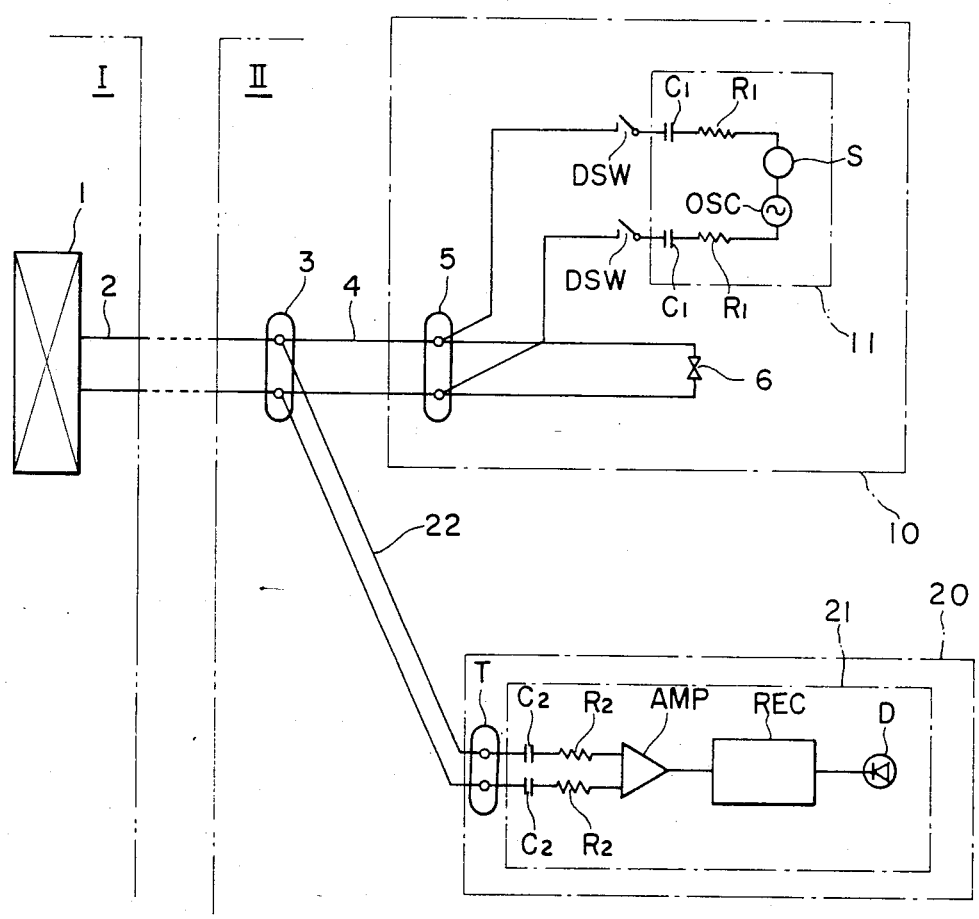

Referring first to FIG. 1, designated as I is a telephone central office and as II a building having a large number of rooms 10. In FIG. 1 only one room is shown for simplicity of illustration. Denoted at 20 is a central surveillance room. Telephone sets 6 in the rooms 10 are connected to a telephone switching unit 1 of the central office I in the usual manner by telephone cables 2 extending between the switching unit 1 and a terminal plate 3 in the builing II and by telephone cables 4 extending between the terminal plate 3 and the station-side terminal plates 5 in the rooms 10.

Installed in each room 10 is a detecting means (or transmitter) 11 capable of generating a detection signal upon detection of an abnormal condition of the room 10. The transmitter 11 is constituted by a sensor S, an oscillator OSC for generating a detection signal of an inaudible frequency (e.g., higher than 20 kHz) and of a low level (e.g., lower than $-40$ dB), a resistor $R_1$ and a DC blocking capacitor $C_1$ connected in series to the oscillator OSC. Although one sensor S and one detection signal generator OSC are incorporated in the particular example shown, it is possible to employ a plurality of different types of sensors S such as a smoke sensor, a heat sensor, a gas sensor, a window-opening sensor, a water leakage sensor and so forth in combination with a corresponding number of detection signal generators with different oscillation frequencies (or in combination with one detection signal generator generating signals with various oscillation frequencies). Upon occurrence of an abnormal condition, a relevant sensor S actuates the corresponding detection signal generator OSC to generate a detection signal.

The transmitter 11 of the above-described construction is connected to the terminal plate 5 through a door switch DSW which is turned on upon locking of a door key to the room 10. Accordingly, the telephone 6 and transmitter 11 are connected in parallel with each other.

A central surveillant panel 21 which is provided in the surveillance room 20 includes a DC blocking capacitor $C_2$, a resistor $R_2$, an amplifier AMP for amplification of the low-level detection signal, a receiver for discriminating received signal by its frequency, and an indicator D having a light emitting diode or the like. Indicated at T is a terminal plate of the central surveillant panel 21 which is connected to the terminal plate 3 by cables 22.

When someone is in the room 10 and the door is not locked, the door switch DSW is in off-state as shown, completely disconnecting the transmitter 11 from the terminal 5. Accordingly, even if the sensor S is actuated due to the occurrence of an abnormal condition the detection signal is not sent to the central surveillant panel 21. If one locks the door key to leave the room 10, the door switch DSW which is associated with the door lock is turned on to connect the transmitter 11 with the terminal 5. When an abnormal state takes place under these circumstances, the sensor S is actuated and the detection signal generator OSC produces a particular detection signal to be sent to the central surveillant panel 21. The detection signal which is fed to the central surveillant panel 21 is amplified to a predetermined level by the amplifier AMP and applied to the receiver REC to discriminate its frequency. If it is discriminated as a signal from the transmitter 11, the display D is actuated to indicate the situation.

In the apparatus according to the present invention, when the door switch DSW is turned on, the transmitter 11 is connected in parallel with the telephone 6. This imposes no adverse effects on the operation of the telephone switching unit 1 since a direct current is blocked by the capacitor $C_1$. Further, although the central surveillant panel 21 is constantly connected to the terminal plate 3, the central surveillant panel also has no possibilities of adversely affecting the operation of the telephone switching unit 1, because it has high impedance to voices and ringing (16 Hz) and a direct current is blocked by the capacitor $C_2$.

Figure 2:
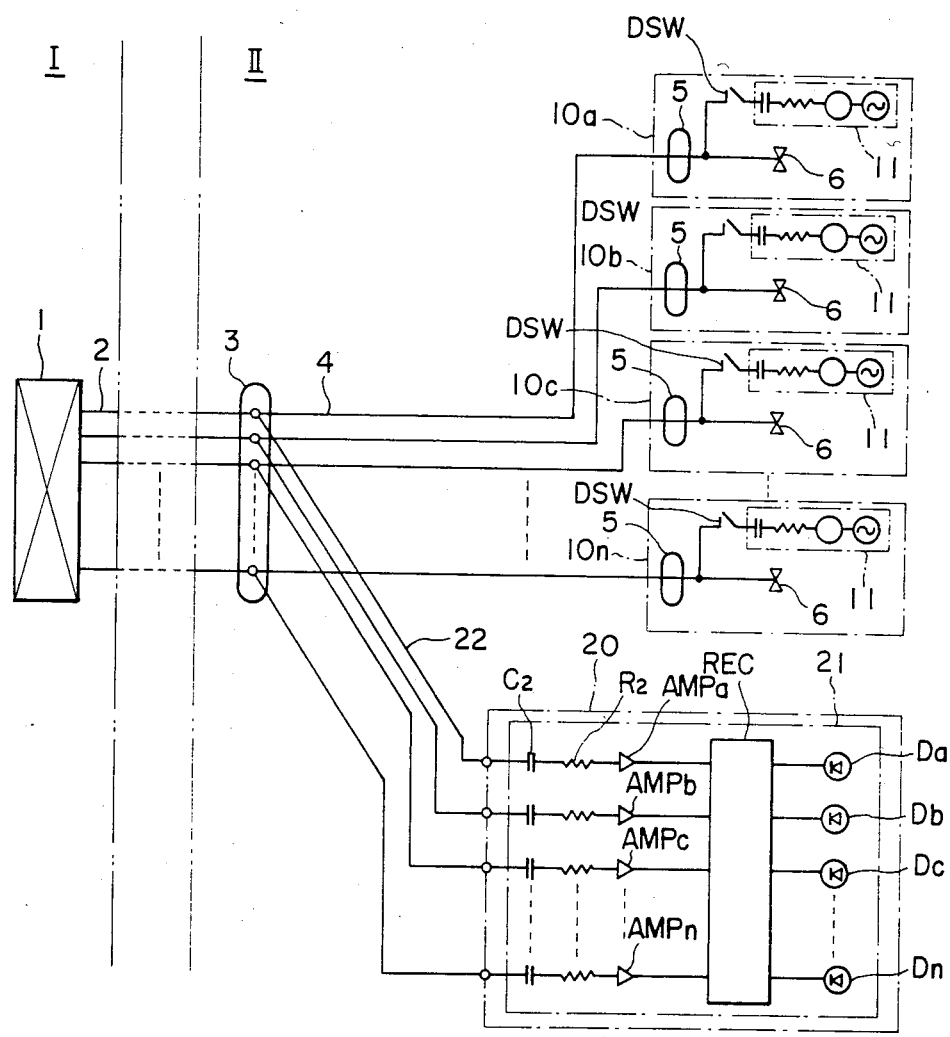
FIG. 2 is a circuit diagram of another embodiment of the present invention.

FIG. 2 is a circuit diagram of the apparatus according to the present invention, as applied to a building having a number of rooms 10a, 10b, . . . 10n. Similar components parts are designated by the same reference numerals or abbreviations throughout the drawings. Each room is provided with the same transmitter 11 as described with reference to FIG. 1, the transmitter being connected to its terminal 5 in parallel with its telephone set 6. For the purpose of simplicity, wirings are illustrated as a single line in FIG. 2. The transmitters are arranged to generate detection signals different with each other in frequency. The central surveillant panel 21 is provided with amplifiers AMPa, AMPb, . . . AMPn corresponding in number to the number of the rooms 10a, 10b, . . . 10n. The receiver REC receives the amplified detection signal and descriminates by its frequency the origin of the signal for the actuation of the corresponding indicator. Although not shown, each of the rooms may be provided with two or more sensors for the detection and prevention of damages due to fire, gas, robbery and other destructive conditions. The receiver REC descriminates the room from which the detection signal is generated and the kind of the abnormal conditions. The transmitter can include any other types of detector than oscillation type, such as a DC type or a digital type.

Figure 3:
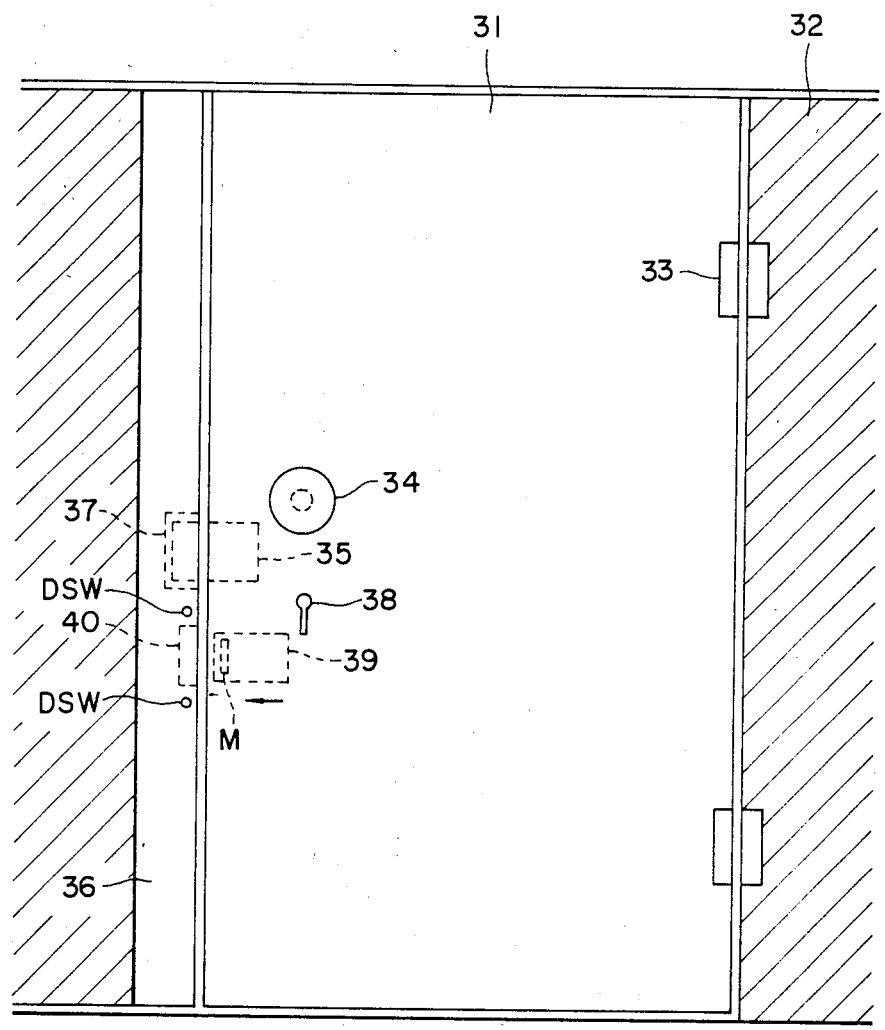
FIG. 3 is an elevational view schematically showing a room door equipped with a lock and a switch operable in association with the lock.

Shown in FIG. 3 is an example of the door switch DSW, wherein indicated at 31 is a door which is swingably supported on a frame member 32 by hinges 33 and can be opened upon turning a knob 34 to retract and release a latch bolt 35, indicated by broken line, from engagement with the frame member 32. On the other hand, in order to close the door 31, one brings it flush with a fixed member 36, whereupon the latch bolt 35 is protruded by the action of a spring in the door 31 and engaged with a groove 37 of the fixed member 36 to hold the door in closed state until the knob 34 is turned again.

If a key (not shown) is inserted and turned in a key hole, 38 which is provided in the door 31, a dead bolt 39 is advanced as indicated by an arrow and engaged with a groove 40 provided in the fixed member 36 to lock the door. A permanent magnet M is embedded in the dead bolt 39, and a door switch DSW which consists of a reed switch or the like is mounted on the fixed member 36. Accordingly, the door switch DSW is in off-state, when the dead bolt 39 is in the unlocking position. The door switch DSW is turned on as soon as it enters the magnetic field of the permanent magnet M which is advanced toward the door switch by the door locking action. In this manner, the door switch DSW is turned on and off in relation with the door locking and unlocking actions.

With the above-described building surveillance system, signals of abnormalities which may take place in various rooms of a building are collected by the use of existing telephone cables, thereby to unnecessitate the installation of cables to be used exclusively for the surveillance, without imposing adverse effects on the operation of a telephone switching unit 1 of the central office.

Figure 4:
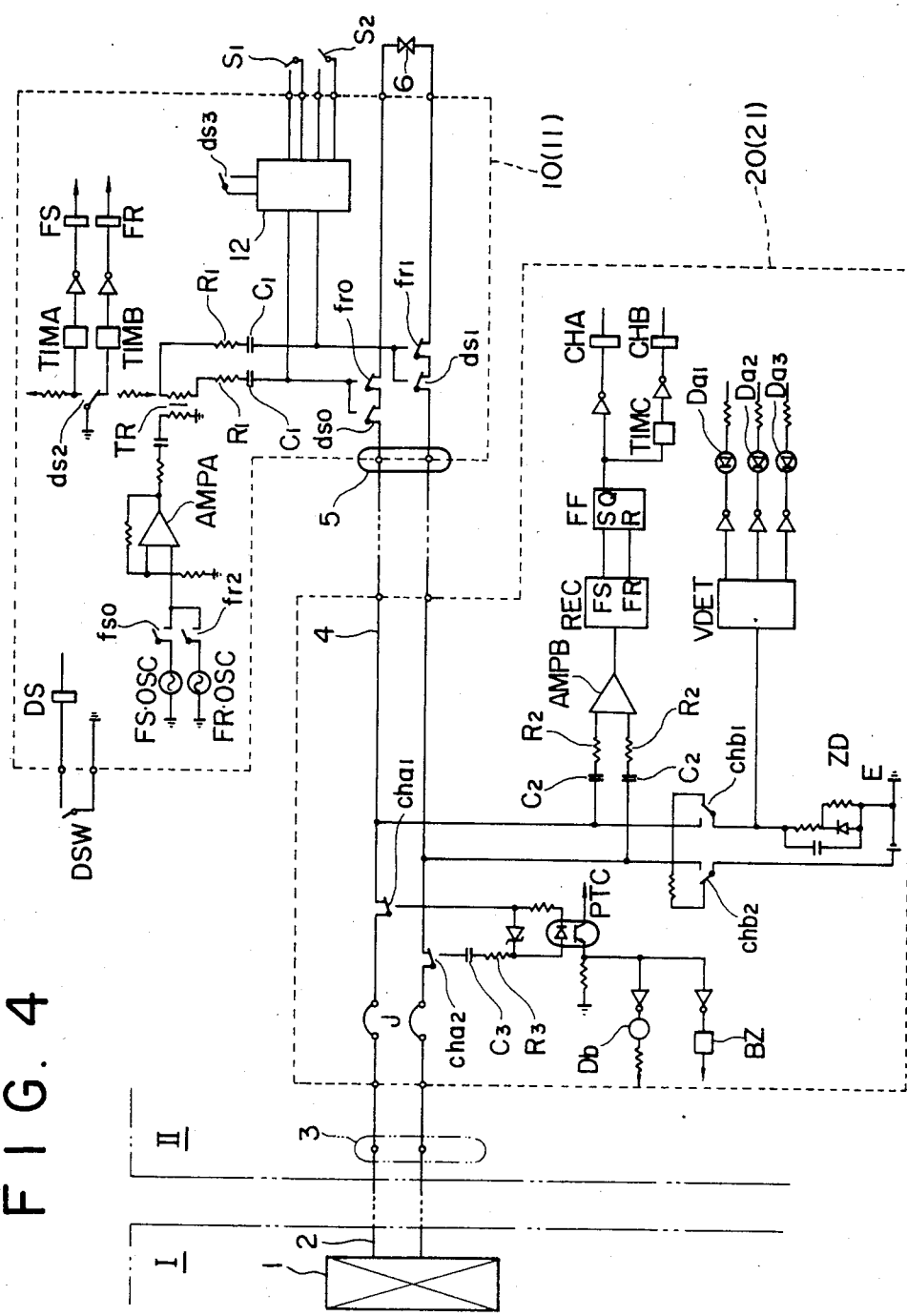
FIG. 4 is a circuit diagram of a further embodiment of the present invention.

In the above-described embodiments, the transmitter 11 is connected in parallel with the telephone 6 during the periods between locking and unlocking of the door 31, and always so is the central surveillant panel 21. In another embodiment of the present invention, the telephone switching unit of the central office is disconnected from cables leading to respective rooms of a building. Referring to FIG. 4, the reference character J denotes a jack; FS.OSC a set signal oscillator; FR.OSC denotes a reset signal oscillator; AMPA and AMPB denote amplifiers; TR denotes a transformer; REC denotes a receiver; TIMA, TIMB and TIMC denote timers; FF denotes a flip-flop; and DS, FS, FR, CHA and CHB denote relays with their contact points being indicated by small letters. For example, the contact points of the relay DS is labeled with ds0, ds1, ds2 and ds3. Indicated at 12 is an information discriminator which, upon receipt of a signal from sensors $S_1$ or $S_2$, produces an output signal of a specific voltage level corresponding to the nature of the alert signal to be given. For example, in the case of gas leakage the sensor $S_1$ is actuated and the discriminator 12 produces DC with a voltage of 10 V, and in the case of fire the sensor $S_2$ is actuated and DC with a voltage of 5 V is produced. The reference character PTC denotes a photocoupler; $R_1$, $R_2$ and $R_3$ denote resistors; $C_1$, $C_2$ and $C_3$ denote capacitors; VDET denotes a voltage discriminator; Da1, Da2 and Da3 denote indicators; E denotes a power supply; ZD denotes a Zener diode; Bz denotes a buzzer; and Db an indicator.

Figure 5:
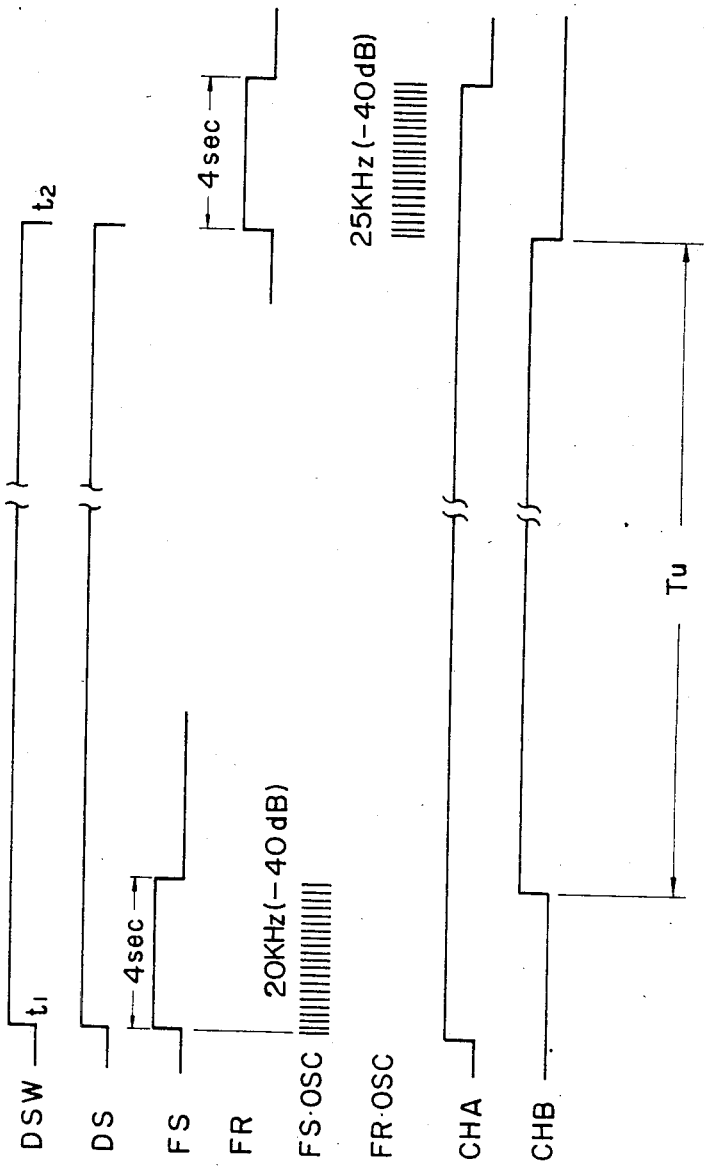
FIG. 5 is a timing chart showing the operation of the apparatus of FIG. 4.

Now, the operation of the apparatus of FIG. 4 is described by way of the timing charts of FIG. 5.

If one locks the door (at time $t_1$) to leave the room, the door switch DSW is closed to actuate the relay DS of the transmitter 11 so that the telephone set 6 coupling to ds0 and ds1 is disconnected from the cables 4 and the transmitter 11 is connected to the cables 4. At the same time, the timer TIMA is actuated so that the relay FS operates for a first predetermined period of time (e.g., about 4 sec.). Then, the set signal (e.g., of 20 KHz and −40 dB) of the set signal oscillator FS.OSC is fed toward the central surveillant panel 21 through the contacts fs0 and ds0.

On the part of the central surveillant panel 21, the set signal is amplified by the amplifier AMPB, the amplified signal fed to the receiver REC to set the flip-flop FF, activating the relay CHA. Thus, the cables 4 coupled to the contacts cha1 and cha2 are disconnected from the telephone switching unit 1. The timer TIMC is also actuated upon setting of the flip-flop FF so that, after lapse of a second predetermined period of time (e.g., about 4 sec.), the relay CHB is actuated to couple the indicators Da1 Da2, . . . to the cables 4 thereby initiating the surveillance of the room 10. Thus, at the time point $t_1$, the telephone cables 4 are disconnected from the telephone circuit at the opposite ends, with the telephone switching unit 1 being coupled to the ringing detection circuit including the photocoupler PTC and buzzer BZ, etc. to cope with a possible call or calls. A pair of the disconnected cables 4 are used as wires for coupling the transmitter 11 to the central surveillance panel 21.

Now, if one unlocks the door to enter the room (at time $t_2$), the door switch DSW is opened and the contact ds2 is returned to the position shown, activating the relay FR for a third predetermined period of time (e.g. about 4 sec.) by the timer TIMB. Then the reset signal (e.g., of 25 kHz and −40 dB) of the reset signal oscillator FR.OSC is fed to the central surveillant panel 21 through contacts fr0, fr1 and fr2. After lapse of the third period of time, the telephone cables 4 are connected to the telephone 6 again.

On receiving the reset signal, the flip-flop FF on the part of the central surveillant panel 21 is reset to switch the relay CHB to initial position, so that the indicators Da1, Da2, . . . are disconnected from the cables 4. After lapse of the third period of time from the time $t_2$, the generation of the reset signal is terminated to reinstate the relay CHA. As a consequence, the telephone switching unit 1 is connected with the cables 4, thereby connecting the telephone 6 to the telephone switching unit 1. In FIG. 5, $T_u$ shows the period of time for which the surveillance is performed. The second period of time set by the timer TIMC is desired to be the same as or longer than the first period of time set by the timer TIMA. It is preferred that the difference between the second and the first period of time be as small as possible to prolong the actual surveillance time $T_u$.

In the above embodiment of FIG. 4, the telephone switching unit 1 of the central office is disconnected from the cables 4 during the locking of the room door. If there is a call during such a period, the caller cannot receive a ringback tone and fails to be indicated that the ringing signal is being applied to the destination outlet. Such a situation takes place even when someone is in the room with the door being locked.

In a further embodiment of the present invention, the building surveillance apparatus is arranged to disconnect a telephone switching unit of the central office from telephone cables during the unlocking of a door but to connect the telephone switching unit to the cables upon receipt of a call during these periods.

FIGS. 6(a) and 6(b) depict, in combination, a circuit diagram of a building surveillance system embodying the present invention, in which surveillance of one room in a building is illustrated by way of example similarly to the case of FIG. 1.

The reference character J denotes a jack; FS.OSC a set signal oscillator; FR.OSC denotes a reset signal oscillator; RGF.OSC denotes a ringing signal detection oscillator; AMPA, AMPB, AMPC and AMPD denote amplifiers; TRA and TRB denote transformers; RECA and RECB denote receivers; TIMA, TIMB, TIMC, TIMD, TIME and TIMF denote timers; FFA and FFB denote flip-flops; and DS, CH, TS, FS, FR, CK, CHA, CHB and RT denote relays with their contact points being indicated by small letters. For example, the contact points of the relay DS is labeled with ds0, ds1, ds2 and ds3. Indicated at 12 is an information discriminator which, upon receipt of a signal from sensors $S_1$ or $S_2$, produces an output signal of a specific voltage level corresponding to the nature of the alart signal to be given. For example, in the case of gas leakage the sensor $S_1$ is actuated and the discriminator 12 produces DC with a voltage of 10 V, and in the case of fire the sensor $S_2$ is actuated and DC with a voltage of 5 V is produced. The reference characters PTCA and PTCB denote photocouplers; $R_1$–$R_7$ denote resistors; COMP denotes a comparator; $C_1$–$C_4$ denote capacitors; CONT denotes a control circuit; VDET denotes a voltage discriminator; Da1, Da2 and Da3 denote indicators; E denotes a power supply; and ZD a Zener diode. Reference characters for those parts which do not need explanation, such as AND gates, OR gates and inverters, are omitted for the sake of simplicity.

The operation of the apparatus of FIGS. 6(a) and 6(b) at the time of locking and unlocking of the door is similar to that of FIGS. 4 and 5. Thus, if one locks the door (at time $t_1$) to leave the room, the door switch DSW (FIG. 6(a)) is closed and the relay DS of the terminal unit 11 is operated to switch its contact ds0, activating the relays TS and FS for a first predetermined period of time (e.g. about 4 sec.) by the timer TIMB. Simultaneously, the flip-flop FFA is set and the relay CH is activated to disconnect the telephone 6 from the cables 4 by opening its contacts ch0 and ch1. At the same time the set signal (e.g., of 20 KHz and −40 dB) of the set signal oscillator FS. OSC is fed for the first period of time toward the central surveillant panel 21 through the contacts fs, ts0, ts1, ch0 and ch1.

On the part of the central surveillant panel 21 (FIG. 6(b)), the set signal is fed to the receiver RECB after amplification by the amplifier AMPC to set the flip-flop FFB, activating the relay CHA. Thus, the cables 4 coupling to the contacts cha0 and cha1 are disconnected from the telephone switching unit 1. The timer TIMF is also actuated upon setting of the flip-flop FFB so that, after lapse of a second predetermined period of time (e.g. about 4 sec.), the relay CHB is actuated for coupling the indicators Da1, Da2, . . . to the cables 4 thereby commencing the surveillance of the room 10. Thus, at the time point $t_1$, the telephone cables 4 are disconnected from the telephone circuit at the opposite ends with the telephone switching unit 1 being coupled to the ringing detection circuit including the photocoupler PTCB to cope with a possible call or calls.

Now, if one unlocks the door to enter the room at time $t_2$, the door switch DSW is opened and the contact ds0 is returned to the position shown, activating the relays TS and FR for a third predetermined period of time (e.g. about 4 sec.) by the timer TIMC. At this time, the flip-flop FFA is reset and the relay CH is returned to the normal position, sending the reset signal (e.g., of 25 kHz and −40 dB) of the reset signal oscillator FR.OSC to the central surveillant panel 21 through contacts ts0, ts1 and fr2. After the lapse of the third period of time, the telephone cables 4 are connected to the telephone 6 again.

On receiving the reset signal, the flip-flop FFB on the part of the central surveillant panel 21 is reset to switch the relay CHB to initial positions so that the indicators Da1, Da2, . . . are disconnected from the cables 4. Upon reset of the flip-flop FFB, the timer TIME is actuated and, after lapse of a fourth period of time (e.g. about 4 sec.) from the time $t_2$, the relay CHA is reinstated, connecting the telephone 6 to the telephone switching unit 1.

If a call is received while the telephone cables 4 are switched to serve as a surveillance line as described hereinbefore, it is detected by the ringing detection circuit which includes the photocoupler PTCB or the like, operating the control circuit CONT to activate the relay RT for a predetermined short period of time. At this time, the ringing signal (e.g., of 30 kHz and −40 dB) from the ringing signal detection oscillator RGF.OSC is fed to the transmitter 11 through contacts rt0, rt1 and rt2.

The ringing signal sent to the transmitter 11 is fed to the receiver RECA after amplification by the amplifier AMPB, actuating the timer TIMA and resetting the flip-flop FFA to return the relay CH. Thus, the relays TS and FR are activated for a fifth predetermined period of time (timer TIMA) to send the reset signal of the reset signal oscillator FR.OSC to the central surveillant panel 21. The telephone cables 4 are connected to the telephone set 6 upon lapse of the fifth period of time.

By the reset signal received by the central surveillant panel 21 after the relay RT has returned to the initial state, the flip-flop FFB is reset to reinstate the relays CHA and CHB, connecting the cables 4 with the telephone switching unit 1.

Accordingly, the telephone 6 now rings, the stop of ringing (bell stop) being checked by the ringing detection circuit constituted by a photocoupler PTCA or the like of the transmitter 11. At this time, if ringing is stopped by a caller hanging up (at a time $t_3$ in FIG. 7) or by a receiver taking the call (at a time $t_3'$), the relay CK is activated by the timer TIMD for a sixth predetermined period of time (about 1 sec.) from a hang-up time $t_3$ or answering time $t_3'$ while checking whether the bell stop is by hanging up or by taking the call by means of the balance circuit including resistors R3 to R5 and comparator COMP. In the case of the disconnection by the caller, the balance circuit becomes unbalance so that the comparator COMP generates a bell stop output, activating the relays CH, TS, FS to connect the telephone cable 4 so as to use as a surveillance line in the same manner as described hereinbefore. If the bell stop is by answering the call, the balance circuit is balanced so that the comparator generates no output. Therefore, the telephone set 6 is kept coupled to the telephone switching unit 1 during and after the call.

I claim:

1. A surveillance apparatus for a building including a plurality of first telephone terminals coupled to a telephone switching unit of a telephone central office, a plurality of rooms each furnished with a door provided with a lock, a second telephone terminal and a telephone set coupled to the second telephone terminal, and cables extending between the first and second telephone terminals, said apparatus comprising:

detecting means provided in each room, adapted to be coupled to the second telephone and capable of generating a detection signal upon detection of an abnormal condition of the room;

switch means adapted for coupling the detection means in each room to said second terminal and operable in relation with the door lock so that the detection means is electrically connected with second telephone terminal when the door is in a locked state and the detection means is electrically disconnected from said second terminal when the door is in an unlocked state; and indicating means coupled to said cables for indicating the occurrence of the abnormal condition upon receipt of the detection signal transmitted from respective detecting means.

2. The apparatus as claimed in claim 1, wherein said indicating means are collectively mounted on a central surveillant panel.

3. The apparatus as claimed in claim 1, further comprising a switch coupling each first telephone terminal to the corresponding cables extending between said first terminal and a respective second terminal and operable during the locking of the corresponding door to disconnect said first telephone terminal from said corresponding cables.

4. The apparatus as claimed in claim 3, further comprising ringing detection means coupled to each switch and capable of being connected with corresponding first terminal during the actuation of the switch, and means coupled to said ringing detection means for operating said switch means and said switch so that when there is a call during the locking of the door said first and second terminals may be connected with said cables and said telephone set, respectively.

5. A surveillance apparatus for a building including a plurality of first telephone terminals coupled to a telephone switching unit of a telephone central office, a plurality of rooms each furnished with a door provided with a lock, a second telephone terminal and a telephone set coupled to the second telephone terminal, and cables extending between the first and second telephone terminals, said apparatus comprising a plurality of surveillance units corresponding in number to the number of the rooms, each surveillance unit including:

detecting means provided in each room and capable of generating a detection signal upon detection of an abnormal condition of the room;

first means actuated upon locking of the door for generating a set signal for a first predetermined period of time;

second means actuated upon unlocking of the door for generating a reset signal for a second predetermined period of time;

a first switch coupling said second terminal to either said first means, second means and detecting means or a telephone set such that said second terminal is electrically connected with said first means, second means and detecting means during the locking of the door and during the period from the unlocking of the door till the expiration of said second predetermined period of time;

indicating means adapted for coupling to a contact in said cables and for indicating the occurrence of the abnormal condition upon receipt of the detection signal transmitted from said detecting means;

a second switch adapted for coupling said first terminal to said contact and actuated so that said first terminal is electrically disconnected from said contact;

a third switch adapted for coupling said indicating means to said contact and actuated so that said indicating means is electrically connected with said contact; and control means having said set and reset signals as its input and actuating said second switch upon receipt of said set signal and actvating said third switch after expiration of a third predetermined period of time from the receipt of said set signal, said third predetermined period of time being not shorter than said first predetermined period of time, said control means resetting said third switch upon receipt of said reset signal and resetting said second switch after the expiration of said second period of time upon receipt of said reset signal;

whereby said telephone set and telephone switching unit are disconnected from said cables upon locking of the door and said indicating means and detecting means are connected to said cables after the expiration of said third predetermined period of time from the locking of the door, said indicating means being disconnected from said cables upon unlocking of the door, with said telephone set and said telephone switching unit being connected with said cables after expiration of said second predetermined period of time from the unlocking of the door.

6. The apparatus as claimed in claim 5, further comprising ringing detection means provided in each surveillance unit so that during the actuation of said second switch the first telephone terminal is connected to said ringing detection means, and a ringing indicator coupled to each ringing detection means for indicating the receipt of a telephone call, said indicating means and ringing indicators being mounted on a central surveillant panel.

7. A surveillance apparatus for a building including a plurality of first telephone terminals coupled to a telephone switching unit of a telephone central office, a plurality of rooms each furnished with a door provided with a lock, a second telephone terminal and a telephone set coupled to the second telephone terminal, and cables extending between the first and second telephone terminals, said apparatus comprising a plurality of surveillance units corresponding in number to the number of the rooms, each surveillance unit including:

detecting means provided in each room and capable of generating a detection signal upon detection of an abnormal condition of the room;

first means actuated upon locking of the door or upon receipt of a bell stop signal for generating a set signal for a first predetermined period of time;

second means actuated upon unlocking of the door or upon receipt of a ringing signal for generating a reset signal for a third or fifth predetermined period of time;

a first switch coupling said second terminal to either said first means, second means and detecting means or a telephone set;

indicating means adapted for coupling to a contact in said cables and for indicating the occurrence of the abnormal condition upon receipt of the detection signal transmitted from said detecting means;

ringing-detection means for detecting ringing;

a second switch adapted for coupling said first terminal to said contact or said ringing-detection means and actuated so that said first terminal is electrically disconnected from said contact but is connected to said ringing-detection means;

a third switch adapted for coupling said indicating means to said contact and actuated so that said indicating means is electrically connected with said contact; and a first control means having said set and reset signals as its input and actuating said second switch upon receipt of said set signal and actuating said third switch after expiration of a second predetermined period of time from the receipt of said set signal, said second predetermined period of time being not shorter than said first predetermined period of time, said first control means resetting said third switch upon receipt of said reset signal and resetting said second switch after the expiration of a fourth period of time, which is not shorter than said third predetermined period of time, upon receipt of said reset signal;

a third means coupled to said ringing-detection means for generating said ringing signal for a seventh predetermined period of time, said ringing signal being fed to said contact;

a fourth means operable during the locking of the door and generating a ringing-stop signal for a sixth period of time when the ringing is stopped;

a second control means for actuating said first switch so that said second telephone terminal is electrically connected with said telephone set during the period from the expiration of said third period of time after the unlocking of the door till the locking of the door and the period from the expiration of said fifth period of time after the receipt of said ringing signal till the receipt of a bell-stop signal; and a discriminator operable when said ringing-stop signal is generated for discriminating whether the stop of the ringing is caused by the disconnection by the caller or by answering the call, said discriminator generating said bell-stop signal when the stop of the ringing is discriminated as resulting from the disconnection by the caller;

whereby said telephone set and telephone switching unit are disconnected from said cables upon locking of the door and said indicating means and detecting means are connected to said cables after the expiration of said third predetermined period of time from the locking of the door, said indicating means being disconnected from said cables upon unlocking of the door, with said telephone set and said telephone switching unit being connected with said cables after expiration of said second predetermined period of time from the unlocking of the door, the telephone set during the locking of the door being capable of being coupled to said telephone switching unit upon receipt of a call.

* * * * *